United States Patent Office 3,320,803
Patented May 23, 1967

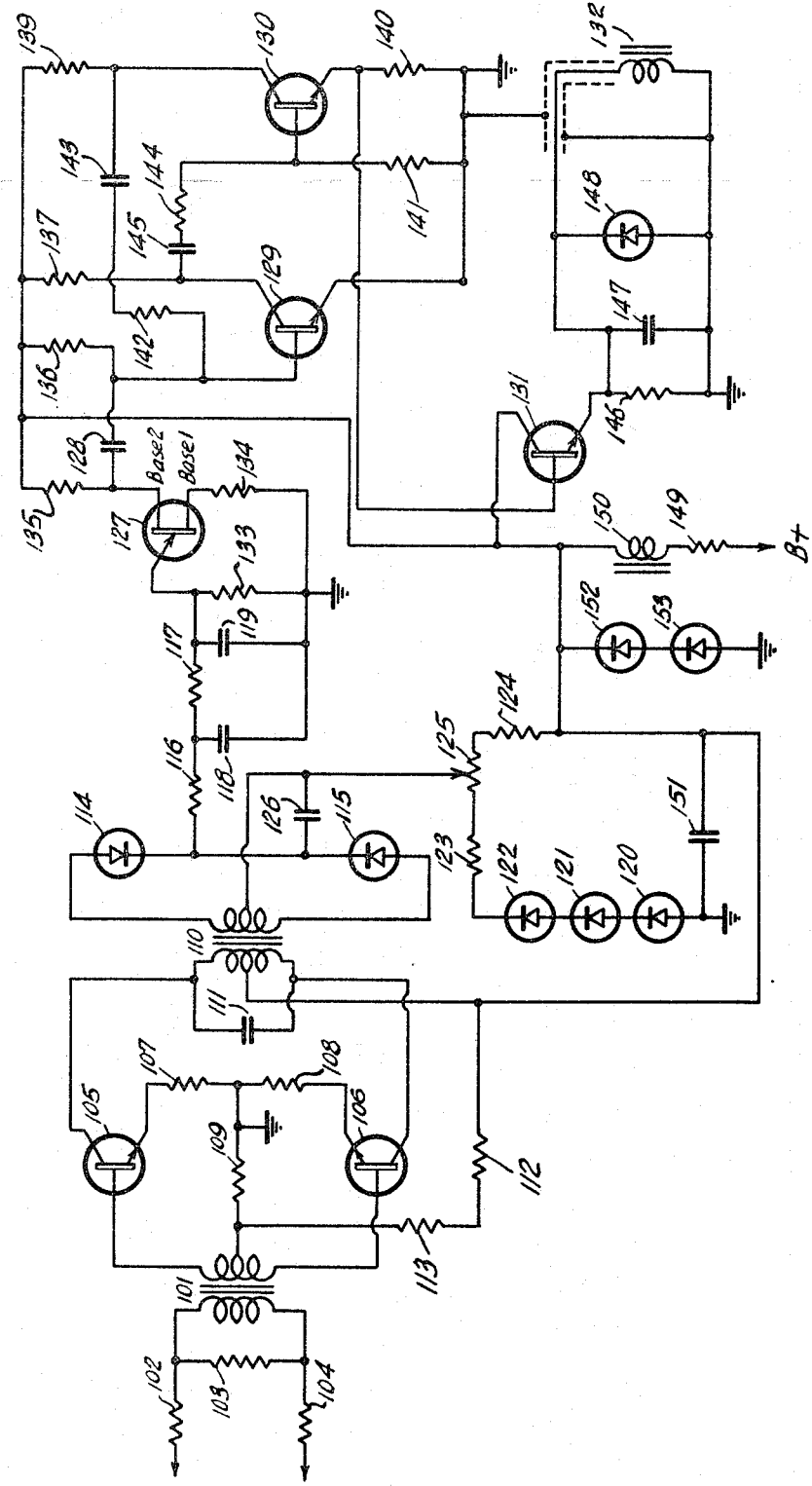

3,320,803
SELF-CONTAINED WELL LOGGING APPARATUS WITH MAGNETIC STORAGE OF INFORMATION
Arthur H. Lord, Bellaire, Tex., assignor to Texaco Inc., New York, N.Y., a corporation of Delaware
Filed Jan. 15, 1962, Ser. No. 166,232
2 Claims. (Cl. 73—152)

This invention relates to a method and apparatus for geophysical prospecting, and more particularly to a self-contained apparatus for logging a borehole.

In the conventional method of well logging, a logging instrument is lowered into a borehole on a steel-shrouded electrical conductor type cable. As the instrument penetrates different geological strata, information in the form of electrical signals is transmitted from the instrument in the borehole to the surface through the conductor cable where it is recorded, usually on a chart.

In another method, the logging instrument is "self-contained" in that all the necessary elements for providing power for operation of the apparatus, for detecting and measuring desired characteristics of the earth formations, and for recording this information are contained in the instrument. Thus, the logging instrument may be lowered into the borehole on a simple wire line or incorporated into a drill collar above the drill bit for logging while drilling as described in copending application Ser. No. 677,969, filed Aug. 13, 1957, now Patent No. 3,149,683. In either event it is not necessary to transmit intelligence to the surface over a conductive cable. Rather, the intelligence is recorded in the logging instrument and "played back" on surface equipment after the instrument has been returned to the surface.

The self-contained logging instrument is adaptable to obtaining the same types of logs as the conventional instruments which transmit the logging intelligence to the surface over a conductor cable. The various types of logs which may be made with the self-contained type of instrument include electrical logs such as resistivity and spontaneous potential; radioactivity logs such as natural gamma, neutron-gamma, neutron-neutron, and gamma-gamma; acoustic logs and so forth.

It is often desirable to conduct a logging operation during the course of drilling a borehole in order to obtain useful information concerning the nature of the earth's formations through which the drill is passing. The self-contained wire line type of instrument lends itself favorably to the making of such logs since this type of instrument may be both smaller and lighter in weight than the usual conductor cable type and may be run in and out of the borehole while the drill pipe is out of the hole with a minimum interruption of drilling time, or in some instances it even may be lowered through the drilling string itself without removing the drill pipe from the hole.

In order to obtain as much information as possible with a single pass of the logging instrument through the borehole it usually is desirable to make two or more logs simultaneously by providing the necessary detection and recording instrumentation in the logging capsule. The apparatus of the subject invention is ideally adapted to the procedure of conducting a multiplicity of logs simultaneously and at the same time recording the information for each of the logs on magnetic tape contained in the sonde. By way of example, compatible logs which may be incorporated in a common instrument may include any two or more of the following logs, as well as some others: resistivity, spontaneous potential, natural gamma ray radioactivity, neutron-gamma ray, neutron-neutron, gamma-gamma, etc.

An object of this invention is to provide an improved type of self-contained logging instrument.

Another object of the invention is to provide an improved type of self-contained logging instrument for making two or more logs simultaneously.

Still another object of the invention is to provide a novel method of recording logging information on magnetic tape and novel apparatus particularly suited for carrying out this method.

A further object of the invention is to provide a novel method of converting various types of logging intelligence to electrical pulses and recording such pulses on magnetic tape.

A still further object of the invention is to provide apparatus for converting logging intelligence from a unidirectional voltage of varying magnitude, also referred to herein as a varying D.C. voltage or signal, to a series of substantially identical pulses for recording on magnetic tape, with subsequent translation of the magnetically recorded information onto a strip chart.

In electrical resistivity logging, the logging intelligence of the characteristics of the formations surrounding a borehole is usually in the form of a varying D.C. voltage, the magnitude of which is proportional to the resistivity of the formation. While it is common practice in electrical logging to record the varying D.C. voltages on a strip chart recorder located at the surface of the earth, such recorders are not dimensionally adapted or sufficiently immune to movement and shock to function properly in downhole apparatus. Moreover, a D.C. voltage which changes magnitude at a relatively slow rate is not ideally adapted for magnetic tape recording and playback with the high degree of accuracy required for proper interpretation of the intelligence.

In accordance with this invention, there is provided a well logging device adapted to be lowered and raised through a borehole. Within the device are included electrical and mechanical components for determining the characteristics of the earth formations surrounding the borehole and for magnetically recording electrical pulses as an indication of these characteristics. In order to record as pulses a signal which occurs as a varying direct current voltage, for example the signal to be recorded when making an electrical resistivity or sponstaneous potential log, a radioactivity log employing ionization chambers, an acoustic velocity or attenuation log, or any other type of log which produces a continuously variable D.C. signal, this signal is transformed into a series of discrete electrical pulses which vary in repetitive frequency as a function of the amplitude of the unidirectional signal voltage.

In accordance with a specific aspect of the invention, apparatus is provided for electrically referring the D.C. signal to a controlled voltage, adjusted to a value just below the trigger threshold of a unijunction transistor or other equivalent pulse-forming system, so that the D.C. input signal added to the controlled voltage will cause the pulse generator to produce short duration pulses. The time spacing of the pulses decreases, i.e. the repetition rate increases, as the magnitude of the signal voltage increases. Thus, signal intelligence is transformed into a pulse-time relationship which is ideally suited for recording on magnetic tape.

A preferred aspect of the invention involves the use of such apparatus for making an electrical resistivity log of the formations surrounding a well bore, which apparatus comprises an elongated instrument housing having two circular conductive electrodes affixed to the outside thereof a predetermined distance apart and electrically insulated from the housing by suitable insulating material. When an electrical current is applied between one of these electrodes, called the current electrode, and a common reference point which may be an uninsulated portion near the end of the housing, a voltage will be developed between the other electrode, called the voltage electrode, and the common reference point which is indicative of formation resistivity. In the present instance the current supplied to the current electrode is provided by means of a transistor type two-stage phase-shift oscillator producing a 400 cycle signal which is further amplified in a push-pull transistor stage and transformer coupled to the current electrode to provide a 400 cycle constant current source of electrical energy. The 400 cycle voltage sensed by the voltage electrode, the magnitude of which is a function of formation resistivity, is rectified and applied to a pulse generator wherein unidirectional electrical pulses are produced with a repetitive frequency which is a function of the magnitude of the 400-cycle voltage detected by the voltage electrode. These pulses are then recorded on magnetic tape as a record of formation resistivity.

In another aspect of the invention an electrical resistivity log and a radioactivity log of the surrounding formations are recorded simultaneously on a dual channel magnetic tape recorder.

For a more complete understanding of the present invention, reference may be had to the following description taken in conjunction with the accompanying drawings wherein:

FIG. 1 diagrammatically represents a combination electrical resistivity and natural gamma ray well logging system which embodies the present invention.

FIG. 3 is a diagram of a circuit for recording electrical resistivity measurements as pulses on a magnetic tape in accordance with the present invention.

Figure 1:
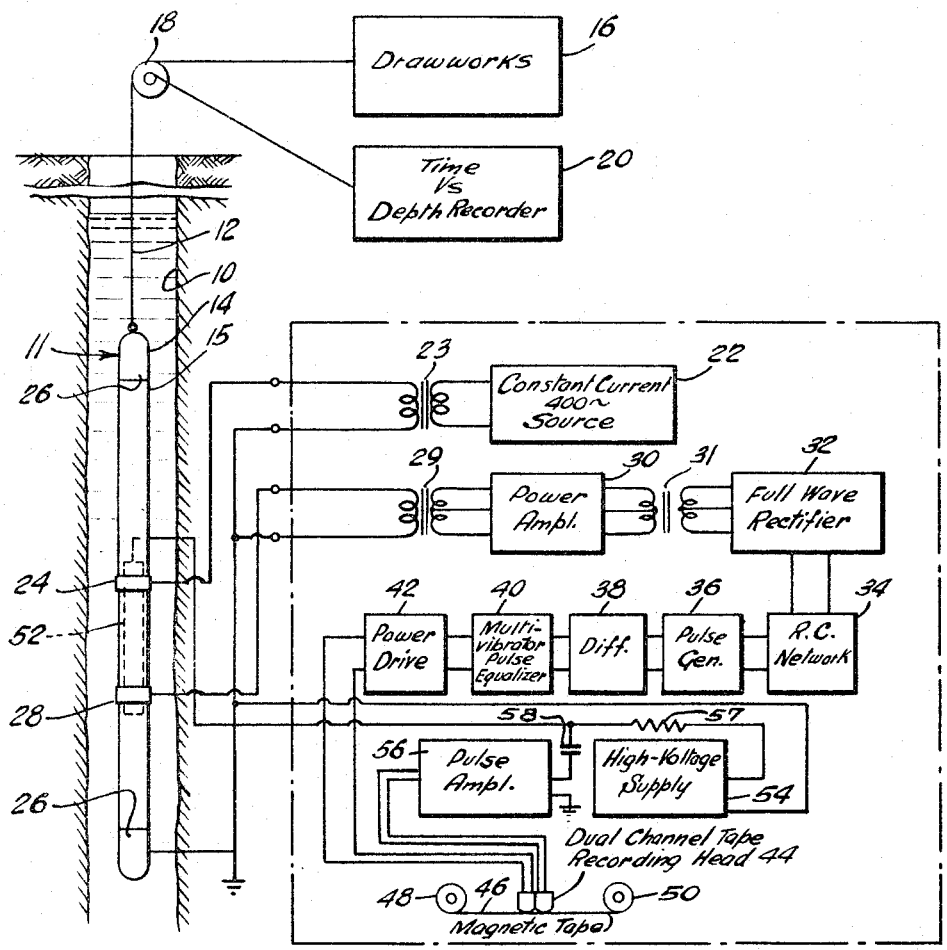

Referring to FIGURE 1 in more detail, a borehole 10 is shown traversing subsurface formations. Logging sonde 11 is suspended within the borehole by means of wire line 12. Sonde 11 has an instrument housing 14 provided with an electrical insulating coating 15 over its entire surface except as each end. Sonde 11 is adapted to be lowered and raised through the hole by means of cable 12 and drawworks 16. At the surface, cable 12 passes over a suitable cable measuring device 18 which is coupled to time-depth recorder 20 and thus provides an indication of the depth of the instrument in the hole at all times.

Within housing 14 are contained all of the components and electrical circuits necessary for recording an electrical and a radioactivity log of the subsurface formations traversed by borehole 10, consisting of a battery-operated constant current 400 cycle source 22 for supplying electrical current to the formation. Source 22 is connected through transformer 23 to current electrode 24 positioned on the outside of housing 14 and insulated therefrom. The return path for the electrical circuit is by means of uninsulated sections 26 at either end of housing 14. Voltage electrode 28 is affixed to the outside of housing 14, insulated therefrom and suitably located between current electrode 24 and lower uninsulated section 26. Voltage electrode 28 and uninsulated section 26 are transformer coupled to battery operated power amplifier 30 by step-up transformer 29. The output of power amplifier 30 is coupled by means of push-pull transformer 31 to full-wave rectifier 32 where the 400 cycle amplified signal is converted to a D.C. voltage, the magnitude of which is proportional to the electrical resistivity of the formation. The rectified voltage from full-wave rectifier 32 is applied to resistance-capacitance network 34 which determines the pulse-time versus signal magnitude relationship. The output of R–C network 34 is coupled to the input of pulse generator 36 where the input signal amplitude is converted to a series of pulses having a repetitive frequency which is a function of the amplitude of the unidirectional rectified voltage produced in rectifier 34. Pulses formed in pulse generator 36 are differentiated in differentiator 38 and coupled to multi-vibrator pulse equalizer 40. The output of pulse equalizer 40 is connected to a power amplification output stage 42 and the amplified pulses are coupled to dual channel tape record head 44 which records the signals on magnetic tape 46 as the tape passes from supply spool 48 to take-up spool 50.

Further details of the circuits and components of the elements of FIGURE 1 identified by numerals 29 through 46 are contained hereinafter in the description of the elements of FIGURE 3 wherein element 101 of FIG. 3 corresponds to element 29 of FIG. 1; elements 105, 106, 107, 108, 109, 112, and 113 of FIG. 3 relate to element 30 of FIG. 1; elements 110 and 111 of FIG. 3 relate to element 31 of FIG. 1; elements 114, 115, 120, 121, 122, 123, 124, 125 and 26 of FIG. 3 relate to element 32 of FIG. 1; elements 116, 117, 118 and 119 of FIG. 3 relate to element 34 of FIG. 1; elements 127, 133 and 134 of FIG. 3 relate to element 36 of FIG. 1; element 128 of FIG. 3 corresponds to element 38 of FIG. 1; elements 129, 130, 136, 137, 139, 140, 141, 142, 143, 144 and 145 of FIG. 3 relate to element 40 of FIG. 1; elements 131, 146, 147 and 148 of FIG. 3 relate to element 42 of FIG. 1; and element 132 of FIG. 3 corresponds to element 44 of FIG. 1.

Also contained within housing 14 is a natural gamma ray detector 52, shown here as a pulse producing current discharge counter of the Geiger-Muller type, but other types of gamma ray detector, for example, a scintillation type detector, may be used with suitable circuit modifications. Detector 52 is connected to battery operated high voltage supply 54 thru resistor 57 and to battery operated amplifier 56 by means of coupling capacitor 58. The output of amplifier 56 drives one channel of dual channel tape record head 44 for recording the amplified and equalized signal from gamma ray detector 52 on magnetic tape 46.

Figure 2:
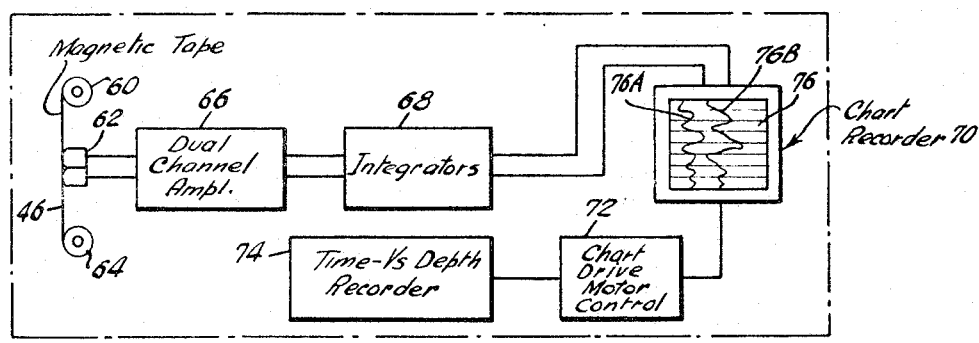
FIG. 2 illustrates surface playback equipment for transcribing the magnetic tape record onto a strip chart recorder.

Referring to FIGURE 2 which diagrammatically represents surface playback equipment for translating information on the magnetic tape to a chart recorder, when sonde 11 has been raised to the surface after the completion of a logging run, opened and the magnetic tape removed therefrom, the tape is played back at the surface to obtain a strip chart record of the logging information. Thus, in FIGURE 2 magnetic tape 46 is rewound onto supply spool 60 from which it passes by dual channel reproduce head 62 to take-up spool 64. Information on magnetic tape 46 is sensed by dual channel magnetic head 62 and output pulses are produced in accordance with the information on magnetic tape 46. These output pulses are coupled from playback head 62 to dual channel amplifier 66 and then to integrator 68 where the pulses for each channel are converted to D.C. voltage, the magnitude of which corresponds to the repetition rate of pulses recorded on magnetic tape 46 during the logging operation. The dual outputs of integrator 68 are coupled to motor-driven chart recorder 70 where they are individually recorded, advantageously as side-by-side traces 76A, 76B on a strip chart 76. The speed of the motor (not shown) of the chart recorder 70 is controlled by chart drive motor control 72 which in turn is controlled by time-depth record 74 produced during the logging operation on recorder 20. The resulting strip chart 76 shows the electrical resistivity and natural gamma radioactivity characteristics of the formations traversed by sonde 11 as a function of the depth of the position of sonde 11 in borehole 10.

An advantageous feature of the invention is that the playback speed of the tape in the surface playback equipment may be faster than the tape recording speed in the sonde by a ratio which can range up to as high as 200 to 1. For example, for a ratio of 10 to 1 the tape transport speed in the sonde may be 22.5 inches per minute and in the surface playback equipment 3.75 inches per second. This permits logging for relatively long periods with rapid data processing. For a 10 to 1 ratio the logging information may be translated from magnetic tape to a chart record in one-tenth the actual logging time.

Referring to FIG. 3 which shows the measuring circuit for the electrical resistivity logging section of the logging tool, the electrical signal sensed by voltage electrode 28 (FIG. 1) and the common reference 26 (FIG. 1) in the logging sonde 11 is applied to transformer 101 through a resistor network comprising resistors 102, 103, and 104 which presents a relatively high impedance to the formations and the output of constant current source 22 (FIG. 1). This network also provides a convenient means for adjusting the signal voltage level across the primary of the transformer 101. The secondary of transformer 101 couples the signal to a class B push-pull transistor power amplifier comprising transistors 105 and 106 with their associated emitter resistors 107 and 108, and base resistors 109, 112 and 113. The collector terminals of transistors 105 and 106 are connected to transformer 110 having a center-tapped primary. Capacitor 111 is connected across the primary of transformer 110 to protect transistors 105 and 106 against high voltage surges generated in the secondary circuit due to firing of diodes 114 and 115 and which are reflected back to the primary winding of transformer 110. Power for the amplifier stage is supplied from a regulated D.C. source which will be described later. The output of transformer 110 is connected to a full-wave rectifier circuit comprising diodes 114 and 115. Since the amplitude of the input signal voltage from voltage electrode 28 is proportional to the formation resistivity, so also is the magnitude of the D.C. voltage at the cathodes of rectifiers 114 and 115. This rectified voltage is applied to the input of a resistance-capacitance network comprising resistors 116 and 117 and capacitors 118 and 119. The secondary center tap of transformer 110 returns to common ground through a Zener diode circuit comprising diodes 120, 121, and 122, fixed resistors 123 and 124, and variable resistor 125. Input filter capacitor 126 is connected between the secondary center tap and the cathodes of diodes 114 and 115.

The output of R-C network 116, 117, 118 and 119 is connected to transistor 127 at the emitter terminal, which is also connected to ground through resistors 133. Resistors 134 and 135 are current limiting and load resistors, respectively, resistor 134 being connected from base-1 to ground and resistor 135 connected from base-2 to the B+ supply voltage. With this arrangement, the no-signal voltage applied across the emitter-base 1 portion of transistor 127 maintains the unijunction just below the firing (or trigger) threshold and any input positive-going signal added to the applied Zener-controlled voltage will cause transistor 127 to fire. In the circuit of FIG. 3 the input circuit to transistor 127 is essentially a current injection system. When the emitter-base 1 portion of transistor 127 is in the static or quiescent state, it is not open circuited but presents a significant current leakage path across the R-C network 116, 117, 118, and 119. At the threshold point, the injection of additional current causes the emitter-base 1 portion of transistor 127 to assume a negative resistance characteristic. The resulting low resistance path across capacitor 119 causes discharge of capacitor 119 and partial discharge of capacitor 118, dropping the potential at the emitter of transistor 127 below the threshold point. If the voltage appearing at the input of resistor 116 is barely above the unijunction threshold, then both capacitors 118 and 119 must recharge until reaching the flat portion of the exponential charge curve before again reaching the trigger voltage level of the unijunction, thus the time between discharge is proportionately longer for small input voltages and shorter for large input voltages. As a result, the input signal amplitude is converted to a series of pulses which are digital in nature having a repetition rate which is proportional to the amplitude of the D.C. signal, which pulses are more readily adapted to magnetic tape recording than the original varying D.C. or analog data.

Pulses generated by the circuit including transistor 127 are differentiated by an R-C circuit consisting essentially of capacitor 128 and resistor 136 and the differentiated pulses are coupled to the base of transistor 129, which is included in the normally conducting stage of a monostable multi-vibrator with resistor 136 connected between B+ and the base terminal, and resistor 137 connected between B+ and the collector terminal. Transistor 130 is included in the normally off or non-conducting stage of the multi-vibrator with resistor 139 connected between B+ and the collector terminal, resistor 140 between the emitter terminal and ground, and resistor 141 between the base terminal and ground. Resistor 142 and capacitor 143 are connected in series between the base terminal of transistor 129 and the collector terminal of transistor 130. Resistor 144 and capacitor 145 are connected in series between the base terminal of transistor 130 and the collector terminal of transistor 129.

The output of the multi-vibrator is coupled to transistor 131, which is a low impedance output emitter-follower for driving resistivity record head 132. Resistor 146 and capacitor 147 provide near critical damping for the record head and diode 148 is used as a clipper for the back wave.

Signal decoupling for the B+ supply circuit is provided by resistor 149, choke 150 and capacitor 151. Voltage regulation of the B voltage supply is provided by Zener diodes 152 and 153.

In a circuit constructed in accordance with the foregoing description of the circuit diagram shown in FIGURE 3, the following component values have been found suitable for satisfactory operation:

| Element Numeral | Component | Component Value or Identification |
| --- | --- | --- |
| 101 | Transformer | Stancor TA-22. |
| 102 | Resistor | 51 ohms. |
| 103 | do | 6.2 ohms. |
| 104 | do | 51 ohms. |
| 105 | Transistor | Type 2N497. |
| 106 | do | Do. |
| 107 | Resistor | 51 ohms. |
| 108 | do | Do. |
| 109 | do | 50 ohms. |
| 110 | Transformer | Argonne AR-115. |
| 111 | Capacitor | .01 mfd. |
| 112 | Resistor | 1,000 ohms. |
| 113 | do | 100 ohms. |
| 114 | Silicon diode | Type 1N645. |
| 115 | do | Do. |
| 116 | Resistor | 0.3 megohm. |
| 117 | do | 50K ohms. |
| 118 | Capacitor | 0.5 mfd. |
| 119 | do | 0.1 mfd. |
| 120 | Zener diode | Type 650-C5. |
| 121 | do | Do. |
| 122 | do | Do. |
| 123 | Resistor | 750 ohms. |
| 124 | do | 1,660 ohms. |
| 125 | Potentiometer | 1,000 ohms. |
| 126 | Capacitor | 0.25 mfd. |
| 127 | Transistor | Type 2N489. |
| 128 | Capacitor | 0.0005 mfd. |
| 129 | Transistor | Type 2N 339. |
| 130 | do | Do. |
| 131 | do | Type 2N 497. |
| 132 | Record head | Dual trace. |
| 133 | Resistor | 5 megohms. |
| 134 | do | 100 ohms. |
| 135 | do | 2,000 ohms. |
| 136 | do | 51K ohms. |
| 137 | do | 3,900 ohms. |
| 139 | do | Do. |
| 140 | do | 2,000 ohms. |
| 141 | do | 10K ohms. |
| 142 | do | Do. |
| 143 | Capacitor | 0.003 mfd. |
| 144 | Resistor | 5,100 ohms. |
| 145 | Capacitor | 0.003 mfd. |
| 146 | Resistor | 100 ohms. |
| 147 | Capacitor | 0.1 mfd. |
| 148 | Silicon diode | Type 1N645. |

In conducting a logging operation the drill pipe is preferably removed from the bore hole. Ordinarily sonde 11 is lowered rapidly to the bottom of borehole 10 by means of drawworks 16 and wireline type cable 12 and a logging record is made of the characteristics of the various earth formations traversed by the borehole as the sonde is raised to the surface at a constant rate of speed, usually in the range of from 10 to 30 feet per minute. If desired, the borehole may be logged while the sonde is being lowered into the hole, but this procedure is considered to be less reliable in that it sometimes gives an erroneous correlation with depth measurements due to non-uniform descent of the sonde resulting from varying physical conditions in the borehole.

For making an electrical resistivity log, sonde 11 is provided with a current electrode 24 and a voltage electrode 28 which are electrical conductors, such as strips of copper, lead, etc., encircling the sonde, insulated therefrom and electrically connected to the appropriate electronic circuits within the sonde by means of wires passing through feed-thru insulators, not shown, in the housing 14. Current electrode 24 and the sonde housing 14, which serves as a common reference point, are transformer coupled to a 400 cycle constant current source 22 which consists of a battery-driven two-stage phase-shift transistor oscillator with positive feed back, and intermediate buffer stage, for minimizing variable loading effects on the oscillator, and a power amplier. The electrical circuit between current electrode 24 and the uninsulated ends 26 of housing 14 is completed through the formations surrounding the bore hole.

Electrical current passing through the formations between electrode 24 and common reference 26 develops an electrical potential between voltage electrode 28 and the common reference points 26, which is proportional to the electrical resistivity of the earth formations opposite the sonde. The 400 cycle voltage sensed by voltage electrode 28 is amplified (30) and the amplified signal is then rectified (32). The resulting D.C. voltage is converted (34, 36 and 40) into a series of equal height pulses having a repetition rate proportional to the amplitude of the 400 cycle signal and therefore a direct function of formation resistivity. The repetitive pulses are coupled by a power drive stage 42 to dual channel tape record head 44 and recorded on magnetic tape 46.

A natural gamma ray log may be obtained concurrently with an electrical resistivity log by making a magnetic tape recording of pulses resulting from the natural gamma radiation in the bore hole being detected by radiation detector 52 contatined within sonde 11. Radiation detector 52 is shown in FIG. 1 as being of the gas-filled current discharge type, such as a Geiger-Muller or a multiplate cathode counter. However, it is contemplated that any suitable radiation detector sensitive to gamma radiation naturally existing in a bore hole might be employed. A suitable electrical potential, usually in the range of 800 to 1200 volts, is applied between the anode and the grounded cathode of detector 52 by means of a battery-operated high voltage supply 54 through series resistor 57. When a gamma ray is detected a negative pulse appears at a capacitor 58 and at the input of amplifier 56, which in addition to amplifying and impedance matching stages also contains a mono-stable multi-vibrator for producing output pulses of equal amplitude. The output from amplifier 56 is coupled to the gamma ray log portion of dual channel tape record head 44. Here the pulses are recorded on magnetic tape 46 as it passes by tape record head 44 from supply spool 48 to take-up spool 50.

In making a log of a bore hole, in order to facilitate log interpretation it is desirable to allow sonde 11 to remain stationary for a few minutes in the bore hole at the point where the log is to start. This provides a short static section on the logging record which is easily identifiable. When initiating an upward movement of sonde 11, by starting draw works 16, the exact time of starting is noted and a uniform speed achieved as quickly as possible in order to facilitate interpretation and correlation as a function of depth. When the sonde has reached the point at which the log is to be terminated, draw works 16 are stopped as precisely as possible at the desired depth point, the exact time is noted and again time is allowed for a short static run for identification and correlation purposes.

For accurate depth correlation purposes time-depth recorder 20 may be connected to cable-measuring device 18 and actuated thereby to provide a record of the depth of sonde 11 in the bore hole at any given time.

After the desired interval of earth formations has been logged, sonde 11 is raised to the surface and removed from bore hole 10. Magnetic tape 46 is then removed from housing 14 and rewound on supply spool 60 in the surface play-back equipment shown in FIG. 2 in order that the first portion of the recorded log will be on the outside of the spool. When the surface play-back unit is operated, magnetic tape 46 passes dual channel reproduce head 62 which senses the logging information of tape 46 and feeds it in the form of electrical pulse signals to dual channel amplifier 66.

Amplified pulses from both the electrical resistivity and gamma ray log channels of amplifier 66 are fed separately to dual channel integrator 68 where the pulses for each channel are integrated to yield a D.C. voltage, the amplitude of which is proportional to the number of pulses occurring in a given time interval. These D.C. signals are then fed to dual channel chart recorder 70 where they are separately recorded on a paper strip chart 76.

Although, the wire line logging system has been described as incorporating means for simultaneously running an electrical resistivity log and a natural gamma ray log, it is contemplated that either of these logs may be run separately, if so desired. It is further contemplated that by suitable modification of the equipment any of the following logs may also be run either singly or in any combination of two or more: neutron-gamma, thermal neutrons, epithermal neutron, fast neutron, gamma-gamma, acoustic velocity, or any other type of log which can be recorded on magnetic tape.

It is also contemplated that the method of converting unidirectional voltage signals to repetitive pulses for recording on magnetic tape is not limited to wire line logging methods but may be used in any so-called self-contained logging system, such as logging while drilling systems where the instrumentation is contained within the drill collar.

It is further contemplated that the method may be employed in fields other than logging where it is desired to magnetically record information originally occurring or observed as, or which may be converted to, a unidirectional voltage of varying amplitude.

Obviously, many modifications and variations of the invention as hereinabove set forth may be made without departing from the spirit and scope thereof and therefore only such limitations should be imposed as are indicated in the appended claims.

I claim:

1. In the method of logging a borehole penetrating the earth wherein self-contained logging apparatus is caused to be moved continuously therethrough at a predetermined uniform speed to obtain an analog type electrical signal indicative of a characteristic of earth formation surrounding said borehole as a function of depth of said apparatus in said borehole and simultaneously making a time-depth record of the location of said apparatus in said borehole as a function of time, the improvement comprising converting said analog type electrical signal to a digital type electrical signal, recording said digital signal on magnetic tape at a predetermined uniform tape transport speed, subsequently playing back said magnetic tape at a predetermined faster tape transport speed than said recording tape transport speed, reconverting said recorded digital signal to an analog type electrical signal, and recording said analog signal on a chart recorder at a predetermined chart speed, said chart speed being controlled by said time-depth record made during the logging operation to produce a chart record of said earth characteristic as a linear function of depth of said logging apparatus in said borehole.

2. A self-contained instrument for logging an earth formation traversed by a well bore comprising a fluid-tight container adapted to be passed longitudinally through said well bore, including means for sensing and recording information indicative of an electrical characteristic of said formation, said sensing and recording means comprising a constant current source of electrical energy, an electrode connected to said source of electrical energy and positioned on the outside of said container and insulated therefrom, a second electrode positioned on the outside of said container and insulated therefrom for sensing a developed alternating current electrical potential in said earth formations, amplifying means coupled to said second electrode for amplifying said developed potential, rectifying means connected to the output of said amplifying means for producing a unidirectional voltage signal proportional in amplitude to said developed electrical potential, pulse generating means coupled to said rectifying means for converting said unidirectional signal into a pulse type electrical signal wherein the repetitive frequency of the pulses varies as a function of the amplitude of said unidirectional signal, and wherein said pulse generating means comprises a unijunction transistor having an input emitter portion, a first ohmic base portion and a second ohmic base portion, a low-pass type resistance-capacitance input network having a predetermined time constant, said input network being connected to said input emitter portion of said transistor, a common point of reference potential connected to said first base portion of said transistor, an output circuit including a source of operating voltage connected to said second base portion of said transistor, and means for applying to said input emitter portion of said transistor a predetermined fixed positive voltage with respect to said common reference point, said predetermined voltage being just below the characteristic trigger threshold voltage of said unijunction transistor, whereby a positive unidirectional signal voltage applied to said resistance-capacitance network will cause said transistor to repetitively trigger with the formation of a series of electrical pulses between said second base portion of said transistor and said common reference point, pulse equalizing means coupled to the output of said pulse generating means for amplitude equalization of said generated pulses and magnetic recording means coupled to the output of said pulse equalizing means for recording said equalized pulses as a function of time to provide an electrical resistivity log of said well bore, said fluid-tight container additionally including detecting means for detecting penetrative radiation, means coupled to the output of said detecting means for amplifying the output therefrom, and means for simultaneously recording said amplified output on said magnetic tape recording means to concurrently provide a penetrative radiation log and an electrical resistivity log correlated with respect to both time and location of said container in said well bore.

References Cited by the Examiner

UNITED STATES PATENTS

| | | | |
|---|---|---|---|
| 2,412,575 | 12/1946 | Frosch | 73—152 |
| 2,425,868 | 8/1947 | Dillon | 73—152 |
| 2,479,518 | 8/1949 | Scherbatskoy | 346—33 |
| 2,677,790 | 5/1954 | Arps. | |
| 2,685,798 | 8/1954 | Gobel. | |
| 2,826,696 | 3/1958 | Suran | 331—111 |
| 2,879,126 | 3/1959 | James. | |
| 2,953,685 | 9/1960 | Dewan. | |
| 2,968,770 | 1/1961 | Sylvan | 331—111 |
| 2,997,665 | 8/1961 | Sylvan | 307—88.5 |
| 3,022,469 | 2/1962 | Bahrs et al. | 328—66 X |
| 3,047,794 | 7/1962 | Bennett et al. | 346—33 X |
| 3,086,168 | 4/1963 | Buckner | 346—33 X |
| 3,103,626 | 9/1963 | Burton et al. | 324—1 |

RICHARD C. QUEISSER, *Primary Examiner.*

J. P. BEAUCHAMP, *Assistant Examiner.*